July 10, 1951
LA VERN H. DE HAVEN
2,559,852
FILTER ELEMENT
Filed Aug. 1, 1946
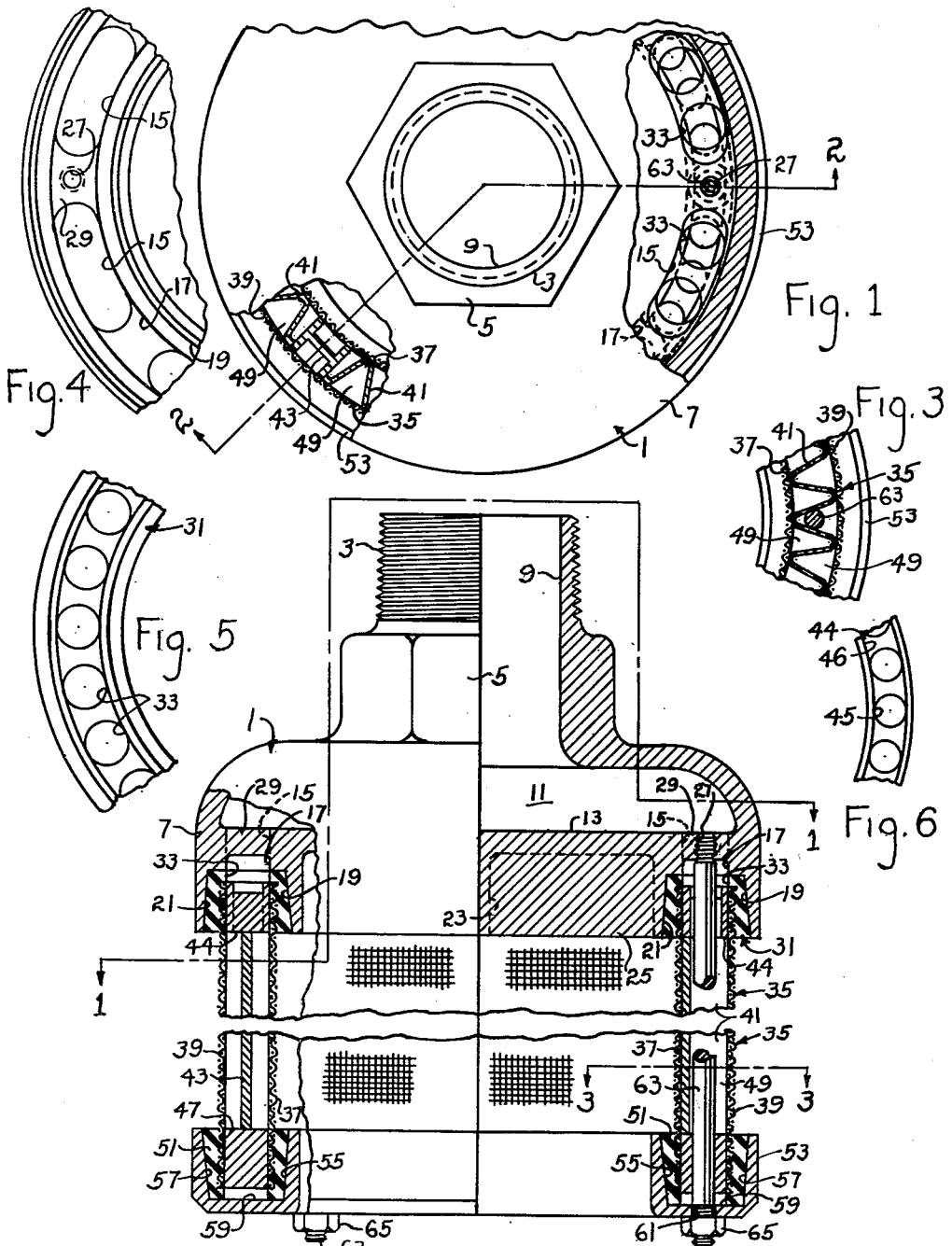
INVENTOR.
LaVern H. DeHaven
BY Edmund W. E. Kamm
ATTORNEY Patented July 10, 1951

2,559,852

UNITED STATES PATENT OFFICE 2,559,852

FILTER ELEMENT

La Vern H. De Haven, Fort Wayne, Ind., assignor to Bowser, Inc., Fort Wayne, Ind., a corporation of Indiana Application August 1, 1946, Serial No. 687,741

8 Claims. (Cl. 210—170)

This invention relates to a filter element. More specifically, it relates to a separable, two-sided cylindrical filtering element, using screen as the filtering medium or as a support for a filter aid precoat.

It has been found that in a filter element using two concentric screens spaced by a corrugated separator that the outer screen must be tightly stretched over the separator to prevent dropping of the precoat, which is probably due to vibrations set up in the outer screen by pulsations of the pump.

It has also been discovered that if the outer screen is tightly stretched over the separator, the element will withstand a differential pressure in excess of 100 pounds per square inch without rupturing, whereas a loosely fitted outer screen will collapse at from 50 to 75 pounds per square inch differential pressure.

It is therefore an object of this invention to provide a means for fitting the outer screen tightly over the separator.

It is yet another object of this invention to provide a means for tightening the outer screen over the separator and still retain the demountability of the assembly.

Another object of the invention is to provide means for expanding the separator to stretch the outer screen.

It is still another object of this invention to provide means for tightening the outer screen over the separator, which means is an H section bar inserted between the screens and the adjacent ends of the separator to expand the separator.

It is still another object of this invention to provide a means for tightening the outer screen over the separator, which means will not obstruct the filtrate channels.

It is still another object of this invention to provide a means for tightening the outer screen over a corrugated separator, which means provide filtrate channels substantially equivalent in area to the corrugations in the separator.

It is still another object of this invention to provide a filter element having two concentric screens supported between two heads and having tie rods mounted between the screens so that discharge of cake from the inner screen is not obstructed.

These and other objects of the invention will become apparent from a study of the specification and the drawings which are attached hereto and made a part hereof and in which:

Figure 1 is a top view of the filter element with parts broken away substantially on the line 1—1 of Figure 2 showing the ports leading from the interscreen space, the outlet from the head, and the screens, separator and H bar.

Figure 2 is a vertical section taken substantially on the line 2—2 of Figure 1 showing the head outlet, the interscreen space ports, the screens and their supporting members, the lower head, the H bar, and the tie rods.

Figure 3 is a horizontal section taken on the line 3—3 of Figure 2 showing the concentric screens, the separator, a tie rod and a part of the bottom head.

Figure 4 is a view of the top or outlet head looking up from the bottom and showing the annular groove and the ports.

Figure 5 is a view of a part of the gaskets or grommets from a point midway between the top and the bottom heads.

Figure 6 is a view from the top of the annular ring placed between the screens at the top.

Referring to the drawings, the numeral 1 designates the upper or outlet head which has an externally threaded boss 3 which is provided with a hexagonal portion 5 directly below the threads. The upper head terminates in a bell-shaped flange 7. A channel 9 extends down inside the boss and joins a circular chamber 11 having a bottom wall 13 joined to the flange 7. Elongated circumferential ports 15 extend through the bottom and communicate with a downwardly open, annular channel 17 formed in the flange 7. Both the ports and the channel are in communication with a second and larger annular channel 19 also formed in flange 7 and having upwardly and inwardly tapering walls 21, which make the channel narrower at the top than at the bottom.

A plurality of ribs 23 and 25 extend radially from the axis of the head to flange 7 and axially down, even with the bottom of the flange 7, and serve to reinforce the bottom wall 13 and flange 7.

Two diametrically opposed holes 27 are tapped into the parts of the bottom wall 13 which are designated as the webs 29 separating the ports 15.

A circular grommet 31 of rubber or other compressible material, U-shaped in cross-section, is fitted into the channel 19. The grommet has a series of holes 33 which communicate with the channel 17 and the ports 15.

The upper end of the screen assembly 35 is seated in the grommet and the sides of the grommet are pressed against the exteriors of the screen by the tapering walls 21.

The screen assembly is comprised of an inner screen 37, having its contiguous edges welded to form a cylinder, an outer screen 39, similarly welded to form a cylinder, and a corrugated separator 41 rolled into a cylinder with the longitudinal ends left unconnected and inserted between the screens. An H-shaped bar 43 is inserted between the screens and between the longitudinal ends of the separator so that the flanges of the bar will contact and force the contiguous edges of the separator apart. The bar therefore acts as a wedge to compress the corrugations of the separator. The separator and the H bar terminate even with the lower ends of walls 21 and a ring 44, having perforations 45 and an annular groove 46 (Fig. 6), is inserted above the top of the separator and the H bar and between the screens. A solid ring 47 is employed in a similar manner below the separator and between the screens.

The bottom portion of the screen assembly is fitted into a grommet 51 which is identical to grommet 31. A bottom head 53 has an annular groove 55 which has sides 57 tapering downwardly and in so that the channel is narrower at the bottom than at the top. The channel has a solid bottom 59 through which two clearance holes 61 are drilled and which are aligned in assembly with the tapped holes 27 in the head 1. The grommet 51 is fitted into the annular groove 55.

Rods 63 are threaded at both ends and the top end of each rod screws into a hole 27 while the lower end extends through the bottom head 53. The assembly is compressed longitudinally by the nuts 65 which are threaded onto the lower ends of the rods and which hold the parts in assembled position.

Operation

The filter element is particularly adapted to be immersed in a pressure filter tank and to have its outlet screwed into a deck plate or head so as to communicate with the exterior of the tank or with a filtrate discharge line. The flow of liquid, as will be obvious to anyone skilled in the art, will be through any precoating which is applied to the screens 37, 39, through the screens, longitudinally through the channels or passages 49, through ports 45 in ring 44, holes 33 in grommet 31, channel 17, ports 15 and chamber 11 to the outlet channel 9. In order to backwash the unit, clean liquid is forced in through channel 9 and passes in a reverse path to that just described, out through the screens, and carries with it the precoat cake and any solids trapped thereby.

The corrugations in the separator provide passageways 49 for the filtrate which communicate with the perforations 45 in the ring 44 and the annular groove 46 cut in the top surface of the ring, which in turn permits passage of the filtrate through the holes 33 in the grommet 31, into channel 17, through ports 15 into chamber 11 and thence discharge through channel 9.

The H bar 43, when it is forcibly inserted between the screens as shown in Figures 1 and 2, compresses the separator circumferentially to reduce the apex angles of the corrugations. This increases the radius which encompasses the outwardly directed apices and reduces that which encompasses the inwardly directed ones. In other words, the depth or height of the corrugations is increased to expand the separator 41 tightly against the outer screen 39 taking up the slack in the screen so that it will withstand the filtering pressure. The inner screen tends to expand rather than collapse under differential pressure and, therefore, it has not been found necessary to apply the corrective measures set forth herein to the inner screen.

Further, since the tie rods 63 are disposed in filtrate channels, the flow of unfiltered liquid to and the flow of backwash fluid and filter cake from the inner screen is entirely unobstructed by the lower head. This makes backwashing effective in cleaning the inner screen.

It will be noted that the element can still be readily disassembled for cleaning or repairs by simply removing the nuts 65 and the head 53 and withdrawing the screen assembly from the upper head. The H bar may then be removed by the use of a pair of pliers and thereafter the screens and separator will come apart very easily. The assembly is performed by simply carrying out the above steps in the reverse order.

I have found by actual test that the differential pressure which the screens will withstand without collapse is increased remarkably by the relatively simple expedient set forth herein.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filter unit, the combination of a pair of heads, inner and outer cylindrical filter elements concentrically and sealedly mounted between the heads, a corrugated separator disposed between said elements and having its longitudinal edges in contiguous relation, a bar inserted between said elements and bearing against the contiguous edges of said separator to expand the separator against said outer filter element.

2. In a filter unit, the combination of a pair of heads, inner and outer concentric filter elements sealedly mounted between the heads in spaced relation to each other, a separator, corrugated to form channels which extend parallel to the axis of the elements, disposed between said elements with its longitudinal edges in contiguous relation, and an H bar inserted between said elements with the flanges bearing against the contiguous edges of said separator to expand the separator against said outer element.

3. In a filter unit, the combination of an upper and lower head, inner and outer concentric filter elements sealedly but removably mounted between the heads in spaced relation to each other, a separator, corrugated to form channels which extend parallel to the axis of the elements, disposed between said elements with its longitudinal edges in contiguous relation, an H bar inserted between said elements with its flanges bearing against the contiguous edges of the separator to expand said separator to bear against said outer element, and tie rods disposed in certain of said channels and fixed to said heads for holding said element assembled.

4. In a filter unit, the combination of an upper and a lower head, said lower head being formed as an annulus, inner and outer concentric filter elements sealedly but removably mounted between the heads in spaced relation to each other, a separator, corrugated to form channels which extend parallel to the axis of the elements, disposed between said elements with its longitudinal edges in contiguous relation, an H bar inserted between said elements with its flanges bearing against the contiguous edges of the separator to expand said separator to bear against said outer element, and tie rods disposed in certain of said channels and fixed to said heads for holding said element assembled.

5. In a filter unit, the combination of a pair of heads, inner and outer cylindrical filter elements concentrically mounted between the heads, a corrugated separator disposed between said elements with its longitudinal edges in close contiguous relation, and an H bar inserted between said elements and bearing against the contiguous edges of the separator to compress the corrugations circumferentially and expand the separator so as to tighten said outer element, said H bar extending substantially for the full distance between the heads.

6. In a filter unit, the combination of a pair of heads, inner and outer concentric filter elements sealedly mounted between the heads in spaced relation to each other, a one piece separator, corrugated to form channels which extend parallel to the axis of the elements, formed into a hollow cylinder and disposed between said elements with its longitudinal edges in contiguous relation, and an H bar inserted between said elements with the flanges bearing against the contiguous edges of said separator to expand the separator against said outer element.

7. In a filter unit, the combination of an upper and a lower head, inner and outer concentric filter elements sealedly but removably mounted between the heads in spaced relation to each other, a separator, corrugated to form channels which extend parallel to the axis of the elements, disposed between said elements with its longitudinal edge in contiguous relation, an H bar inserted between said elements with its flanges bearing against the contiguous edges of the separator to expand said separator to bear against said outer element, tie rods disposed in certain of said channels and fixed to said heads for holding said element assembled, said tie rods being fixed in said upper head, and removable fastening means for holding said lower head in place on the rods.

8. In a filter unit, the combination of an upper and a lower head, inner and outer concentric filter elements sealedly but removably mounted between the heads in spaced relation to each other, a separator, corrugated to form channels which extend parallel to the axis of the elements, disposed between said elements with its longitudinal edge in contiguous relation, an H bar inserted between said elements with its flanges bearing against the contiguous edges of the separator to expand said separator to bear against said outer element, said lower head being formed as an annulus, and means for holding said screens and heads in assembled relation.

LA VERN H. DE HAVEN.

REFERENCES CITED

The following references are of record in the file of this patent:

UNITED STATES PATENTS

| Number | Name | Date |
|---|---|---|
| 739,562 | Selg et al. | Sept. 22, 1903 |
| 2,301,120 | Kamrath | Nov. 3, 1942 |

FOREIGN PATENTS

| Number | Country | Date |
|---|---|---|
| 2,126 | Great Britain | A. D. 1907 |
| 169,591 | Great Britain | Oct. 6, 1921 |
| 818,267 | France | June 14, 1937 |